US007884799B2

(12) United States Patent
Ishimaru

(10) Patent No.: US 7,884,799 B2

(45) Date of Patent: Feb. 8, 2011

(54) JOY STICK

(75) Inventor: Hiroshi Ishimaru, Tokyo (JP)

(73) Assignee: Mitsumi Electric, Co., Ltd., Tokyo (JP)

( * ) Notice: Subject to any disclaimer, the term of this patent is extended or adjusted under 35 U.S.C. 154(b) by 1182 days.

(21) Appl. No.: 11/399,479

(22) Filed: Apr. 7, 2006

(65) Prior Publication Data

US 2006/0290669 A1 Dec. 28, 2006

(30) Foreign Application Priority Data

Jun. 22, 2005 (JP) .......................... P2005-182523

(51) Int. Cl.
*G06F 3/033* (2006.01)

(52) U.S. Cl. ..................................................... 345/161

(58) Field of Classification Search ................. 345/156, 345/157, 161; 74/471; 200/5.9; 273/148
See application file for complete search history.

(56) References Cited

U.S. PATENT DOCUMENTS 6,670,945 B1 * 12/2003 Nakamura .................. 345/156
2003/0144752 A1 * 7/2003 Furukawa .................... 700/85

FOREIGN PATENT DOCUMENTS

JP 2001-124056 5/2001
JP 2002-099337 4/2002
JP 2003-223276 8/2003

OTHER PUBLICATIONS

Japanese Office Action dated Aug. 18, 2010 with English translation.

* cited by examiner

*Primary Examiner*—Quan-Zhen Wang
*Assistant Examiner*—Sahlu Okebato
(74) *Attorney, Agent, or Firm*—Whitham Curtis Christofferson & Cook, PC

(57) ABSTRACT

A first casing is comprised of metal and has a side face formed with a cutout portion. A second casing is comprised of resin. A pivot member has a pivot shaft and is disposed between the first casing and the second casing so as to be pivotable about the pivot shaft. The pivot shaft is rotatably supported by a part of the first casing which is other than an edge of the cutout portion.

2 Claims, 7 Drawing Sheets

JOY STICK

BACKGROUND OF THE INVENTION

The present invention relates to a joy stick.

As shown in FIG. 9, a related-art joy stick 9 comprises an upper casing 1; a lower casing 2 engaged with the upper casing 1; a box-shaped casing body 3 formed by coupling the upper casing 1 and lower casing 2; a pair of upper and lower pivot members 4 and 5 disposed so as to be pivotable perpendicularly to each other inside the casing body 3; an operating member 8 having one end portion extending to an outside of the casing body 3 through a pair of slots 6 and 7 respectively formed in the pivot members 4 and 5 so as to extend in longitudinal directions thereof; and a spring (not shown) for urging the pair of pivot members 4 and 5 to place them in their neutral positions, a pair of signal output devices (not shown) operable to output signals corresponding to respective pivoted angles of the pivot members 4 and 5 pivot (see Japanese Patent Publication No. 2003-223276A).

In the related-art joy stick, the upper casing 1 is made of a metal, and the lower casing 2 is made of a resin. A pivot shaft 5*a* is sandwiched in between a bearing 1*a* of the upper casing 1 and a bearing 2*a* of lower casing 2 so as to be rotatably supported in the casing body 3.

As shown in FIG. 10, the metal-made upper casing 1 which is in contact with the pivot shaft 5*a* is formed by press working, and its worked surface serves as the bearing 1*a*. Burrs may be formed on the worked surface. When the pivot shaft 5*a* slides thereon the burrs may cause damage to an outer peripheral surface of the pivot shaft 5*a*. The damaged outer peripheral surface may disturb pivoting and may cause the uncomfortable operation feeling. Further, the outer peripheral surface of the pivot shaft 5*a* may be likely to be worn so that the product lifetime may be shortened. For this reason, management of press working is required so as not to form burrs, so that the cost becomes high.

In addition, both the upper casing and the lower casing may conceivably be made of a resin material to eliminate the occurrence of the burrs, but a problem occurs in terms of durability unless the entire upper casing is formed firmly by being provided with a sufficient thickness.

If the entire upper casing is provided with the sufficient thickness, a shape of the entire upper casing becomes large, so that a downsizing of the joy stick becomes difficult. Further, when the joy stick is mounted on a board, a screw is passed through a hole formed on the board from a lower side of the board, and is fixed to a hole in the lower casing. In this fixing structure, however, since the joy stick is fixed at only one spot, the board maybe broken when excessive force is applied to a screwed portion during the operation.

SUMMARY OF THE INVENTION

It is therefore an object of the invention to provide a joy stick having a downsized, durable and long-life structure in which the burrs do not cause the problems even if the metal-made upper casing is used.

In order to attain the above described object, according to the invention, there is provided a joy stick comprising:

a first casing, comprised of metal and having a side face formed with a cutout portion;

a second casing, comprised of resin; and a pivot member, having a pivot shaft and disposed between the first casing and the second casing so as to be pivotable about the pivot shaft, wherein the pivot shaft is rotatably supported by a part of the first casing which is other than an edge of the cutout portion.

A periphery of the cutout portion may be protruded from the side face so that an inner face of the periphery is inclined; and a peripheral edge of an end face of the pivot shaft may be in line contact with the inclined inner face.

BRIEF DESCRIPTION OF THE DRAWINGS

The above objects and advantages of the present invention will become more apparent by describing in detail preferred exemplary embodiment thereof with reference to the accompanying drawings, wherein.

DETAILED DESCRIPTION OF THE EMBODIMENTS

Embodiments of the invention will be discussed in detail with reference to the accompanying drawings.

Figure 1:
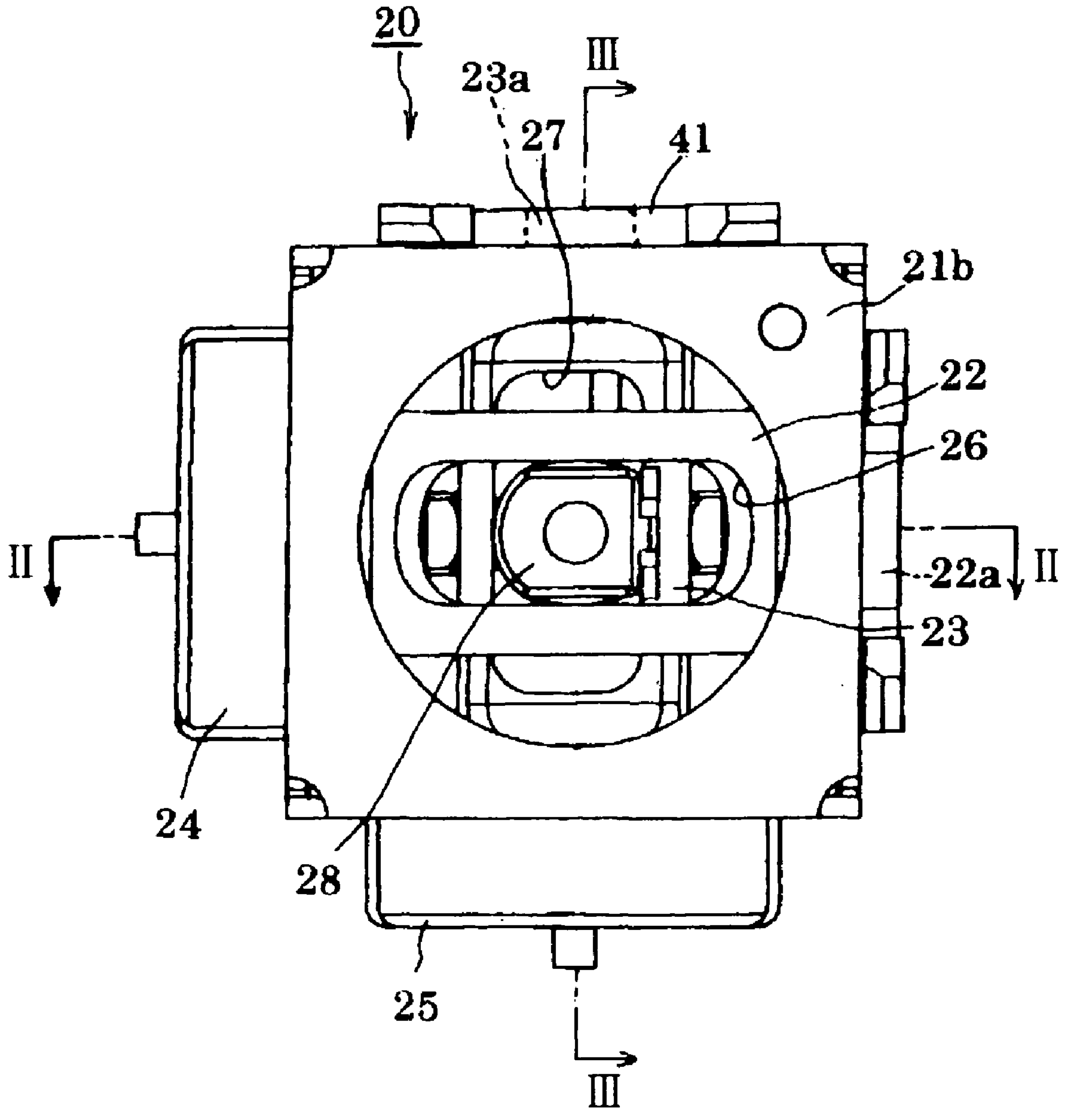
FIG. 1 is a plan view of a joy stick according to an embodiment of the present invention.
Figure 2:
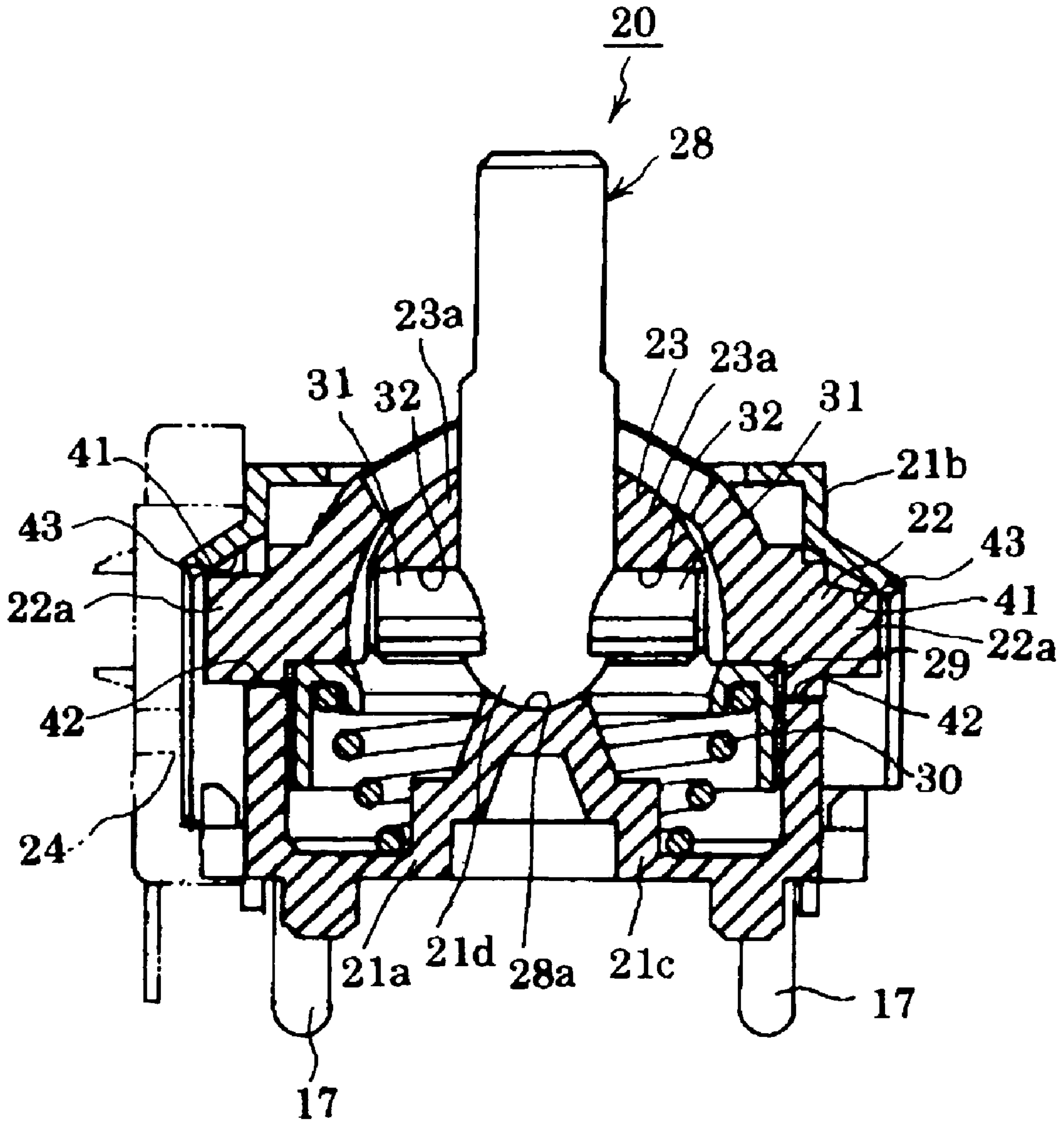
FIG. 2 is a cross section view along the line II-II of FIG. 1.
Figure 3:
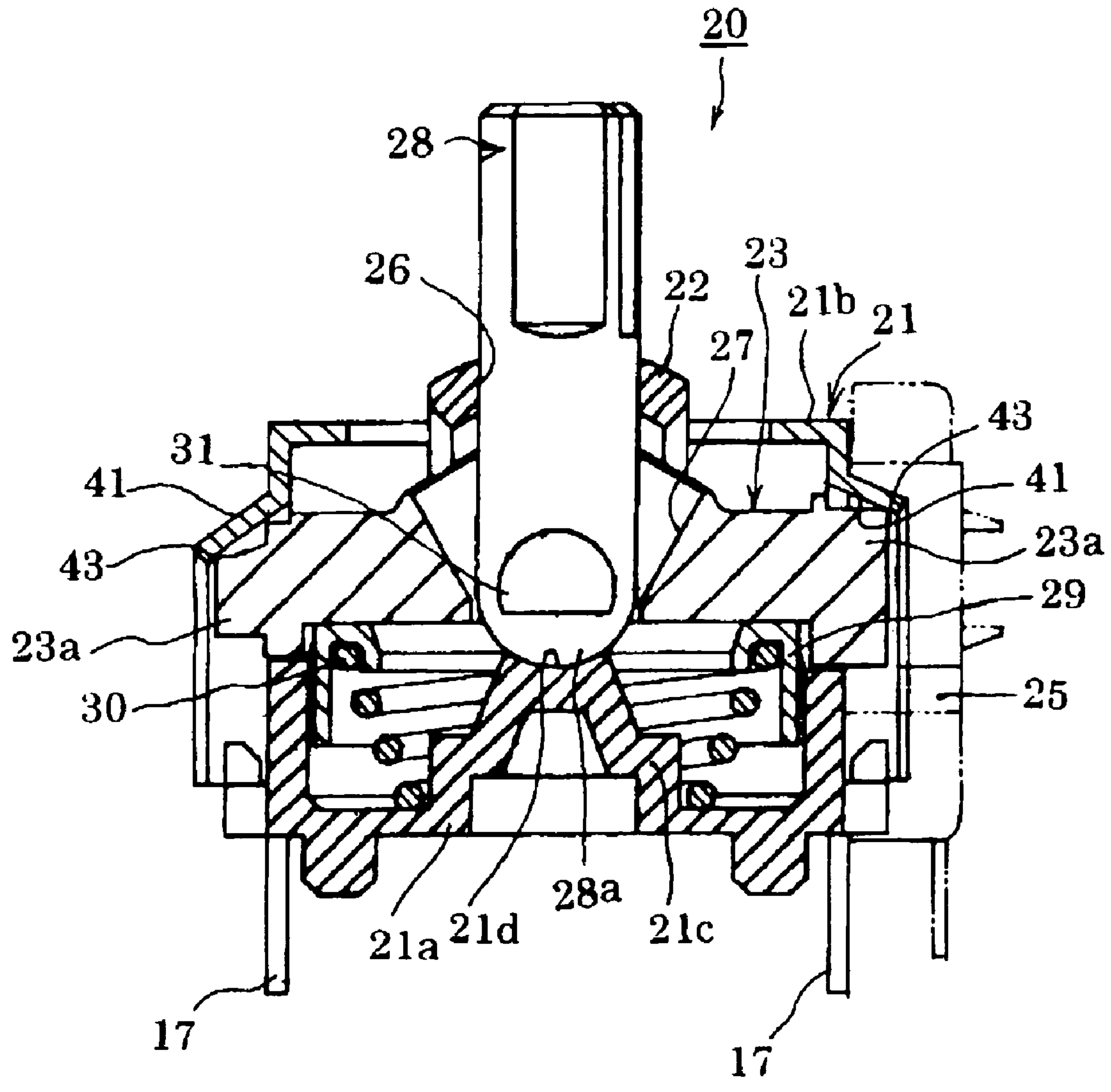
FIG. 3 is a cross section view along the line III-III in FIG. 1.

As shown in FIGS. 1 to 3, a joy stick 20 comprises an upper casing 21*b* and a lower casing 21*a* which is engaged with the upper casing 21*a*. The upper casing 21*b* and the lower casing 21*a* form a box-shaped casing body 21.

The lower casing 21*a* is comprised of a resin. An upper arm 22 and a lower arm 23 are disposed pivotably perpendicular to each other inside the lower casing 21*a*.

The upper casing 21*b* is manufactured by press working, and mounting projections 17 are integrally provided at four corner positions on a lower end portion of the upper casing 21*b* in a state of being extended straightly downward. When the joy stick 20 is mounted on a board (not shown), these mounting projections 17 are inserted into holes provided in the board so that the joy stick 20 is fixed to the board.

In each of the side faces of the upper casing 21*b*, a cutout portion 18 is formed so as to extend from a lower end thereof toward an upper end thereof. At the same time as the press working is performed, a bearing portion 41 is formed at a periphery of the cutout portion 18 by drawing work, so that an inner face of the bearing portion 41 becomes an inclined face. As a result, the bearing portion 41 is protruded outward from each side face of the upper casing 21*b*. That is, a worked edge of the cutout portion 18 which would be formed with burrs is not used as a bearing member, but the inclined face which will not be formed with burrs is used as the bearing member.

Figure 4:
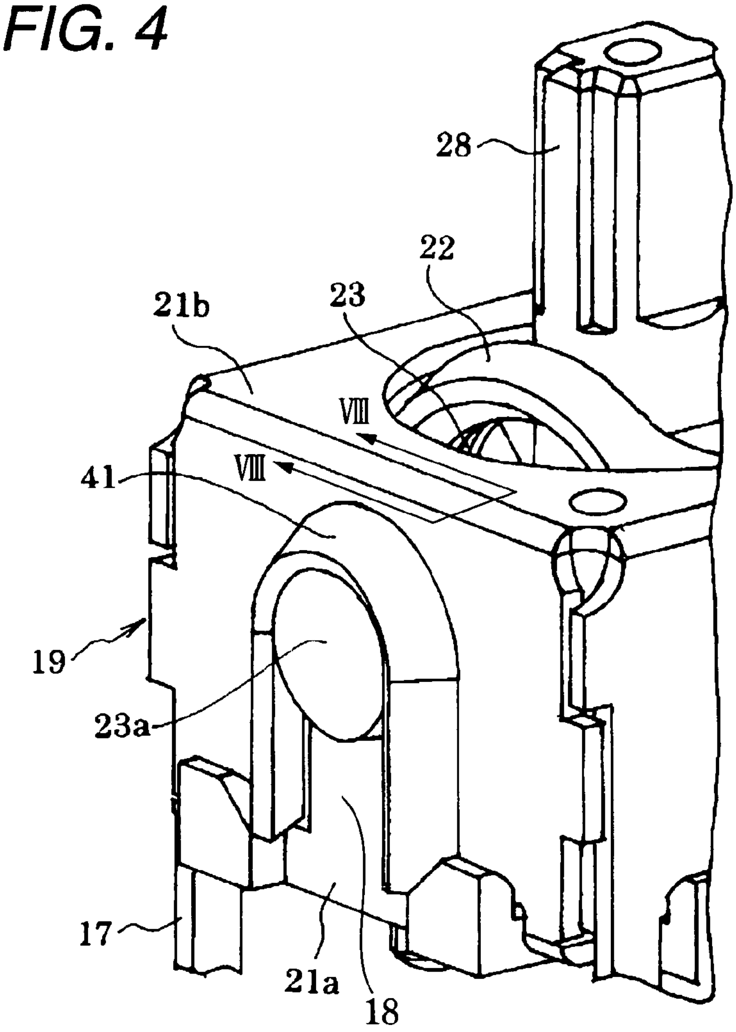
FIG. 4 is an enlarged perspective view of the joy stick.

A bearing 42 is provided at each of four side faces of the lower casing 21*a*. As shown in FIGS. 2 to 4, pivot shafts 22*a* and 23*a* respectively provided with the upper arm 22 and the lower arm 23 (see FIGS. 6A to 7B) are sandwiched between the bearings 41 and 42 at four sides respectively in a vertical direction so as to be rotatably supported in the casing body 21.

Figure 8:
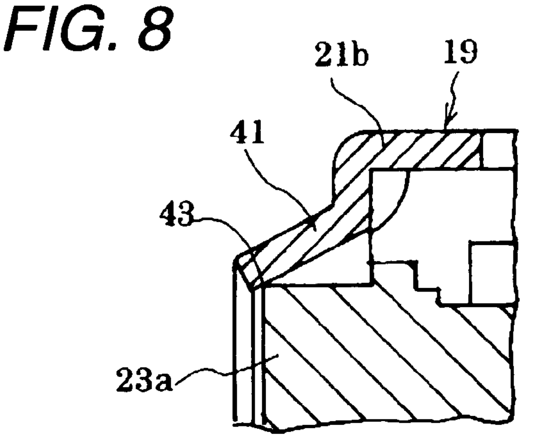
FIG. 8 is a cross section view along the line VIII-VIII of FIG. 4.
Figure 9:
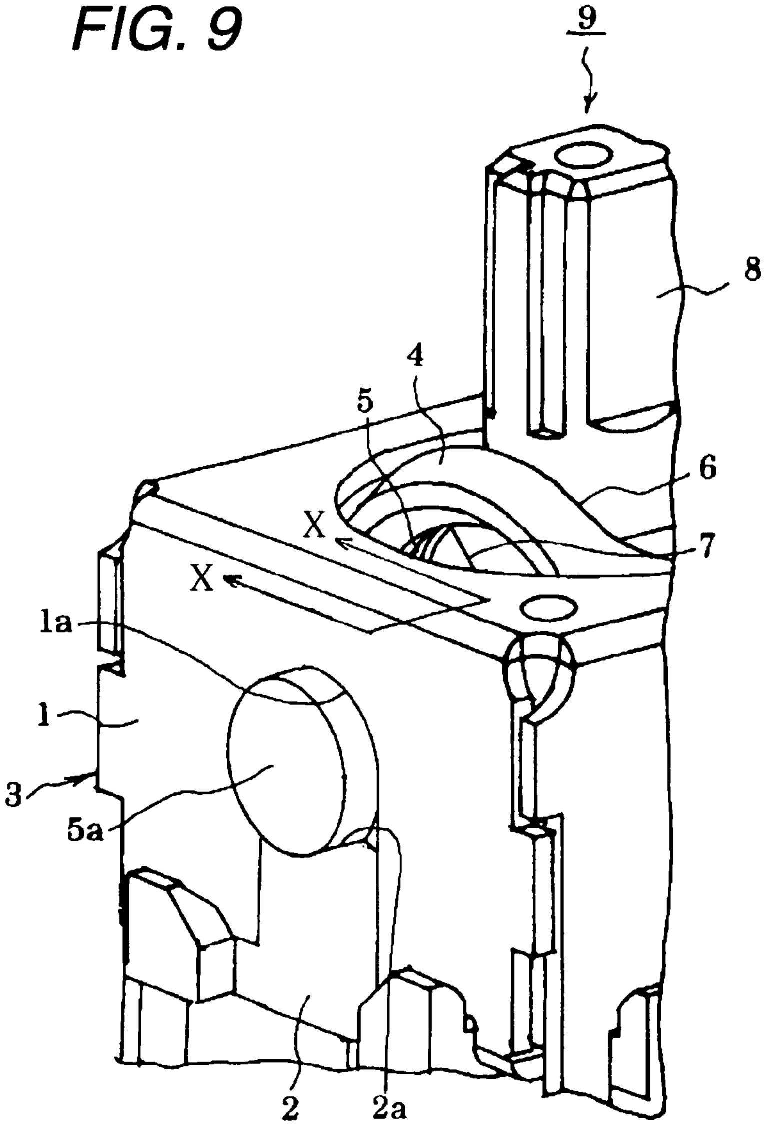
FIG. 9 is an perspective view of a related-art joy stick.
Figure 10:
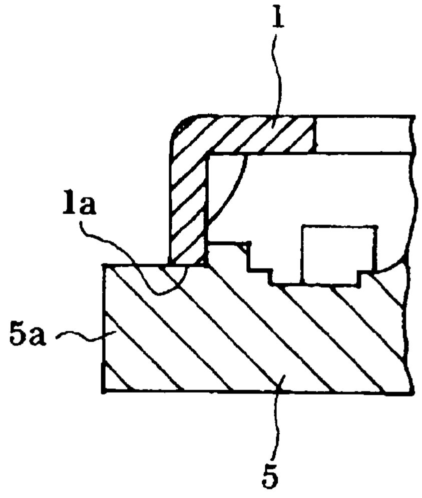
FIG. 10 is a cross section view along the line X-X of FIG. 9.

As shown in FIG. 8, an edge portion 43 at an axial end of the pivot shaft 23*a* is abutted against an inner surface of the bearing 41, and the edge portion 43 is brought into line contact with the inner surface of the bearing 41.

Accordingly, the bearing 41 is projected more outwardly from the side face than the axial end of the pivot shaft 23*a*. Further, as shown in FIGS. 2 and 3, variable resistor 24 is connected to one end of the pivot shaft 22*a* and variable resistor 25 is connected to one end of the pivot shaft 23*a*.

Figure 5:
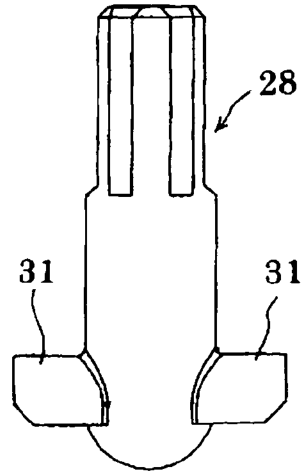
FIG. 5 is a perspective view of an operating stick incorporated in the joy stick.
Figure 6A:
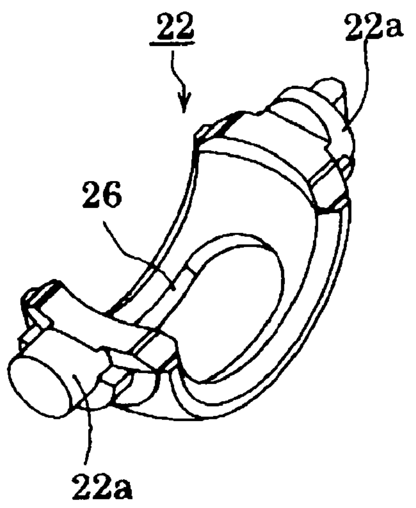
FIG. 6A is a perspective view, taken from below, of an upper arm incorporated in the joy stick.
Figure 6B:
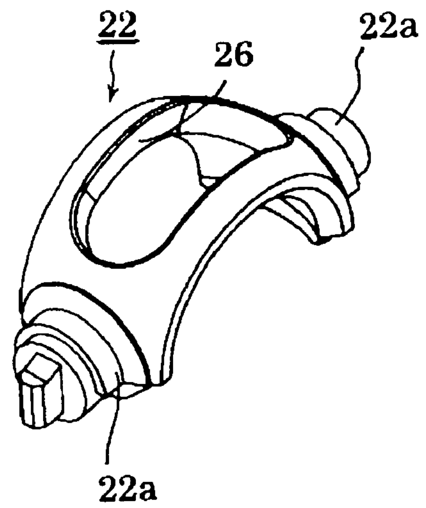
FIG. 6B is a perspective view, taken from above, of the upper arm.

Furthermore, slots 26 and 27 extending in respective axial directions are formed in central portions of the upper arm 22 and the lower arm 23, and an operating stick 28 is provided in such a manner as to be passed in the slots 26 and 27. As shown in FIG. 5, a convex portion 28*a* is formed on a lower end portion of the operating stick 28. Besides, as shown in FIGS. 2 and 3, a concave portion 21*d* is formed on an upper central portion of a base portion 21*c* incorporated in the joy stick 20. The convex portion 28*a* is swingably mounted on the concave portion 21*d*. Meanwhile, a knob (not shown) is fitted to an upper end portion of the operating stick 28.

Thus, in this joy stick 20, when the operating stick 28 is operated, the operating stick 28 is pivoted about the concave portion 21*d*. Then the upper arm 22 and the lower arm 23 are pivoted and the variable resistors 24 and 25 connected to the upper arm 22 and the lower arm 23 are also pivoted. Accordingly, the variable resistors 24 and 25 generate output signals corresponding to the operation of the operating stick 28.

A coil spring 30 is interposed between the base portion 21*c* of the lower casing 21*a* and an annular supporting member 29 abutting against lower face of the lower arm 23 so as to respectively place the upper arm 22 and the lower arm 23 in their neutral positions. Namely, as the coil spring 30 resiliently presses the lower arm 23 upwardly, the upper arm 22 and the lower arm 23 are held in their neutral positions.

Further, as shown in FIGS. 2, 3, and 5, the operating stick 28 has a pair of shaft portions 31 provided at a lower portion of the operating stick 28. The pair of shaft portions 31 is projected from left and right sides of the lower portion of the operating stick 28.

Figure 7A:
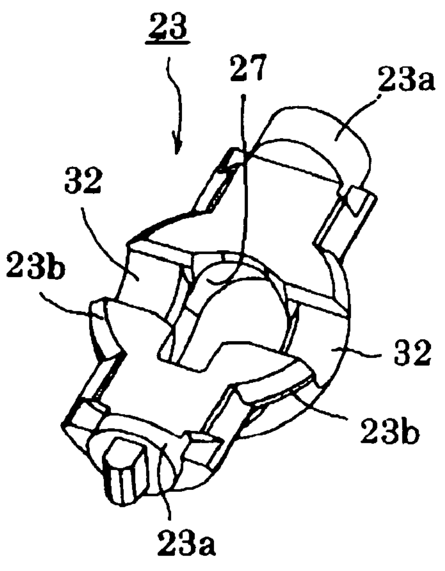
FIG. 7A is a perspective view, taken from below, of a lower arm incorporated in the joy stick.
Figure 7B:
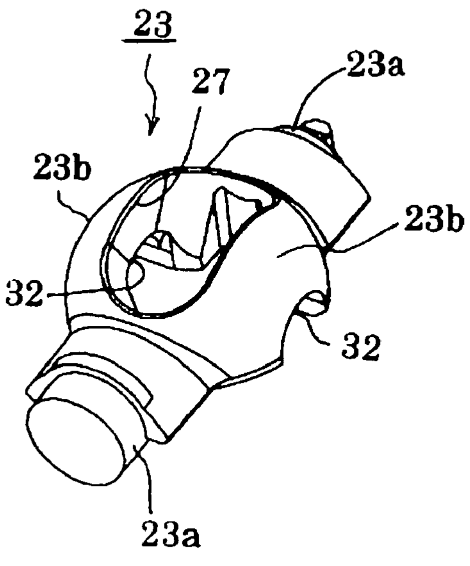
FIG. 7B is a perspective view, taken from above, of the lower arm.

Meanwhile, as shown in FIGS. 7A and 7B, the lower arm 23 further comprises a pair of supporting portions 32 which are formed into substantially semicircular shapes on central portions of lower faces and a pair of left and right side wall portions 23*b*. The supporting portions 32 are provided in a form in which the lower faces are opened in the side wall portions 23*b* of the lower arm 23. Moreover, each of the supporting portions 32 is formed in correspondence with the size of each of the pair of shaft portions 31 provided on the operating stick 28 so that the shaft portion 31 is engaged therein.

Further, the shaft portions 31 are formed with different sizes between left and right, and the supporting portions 32 corresponding thereto are also formed with different sizes between left and right. With this configuration, the shaft portions 31 are not able to be engaged to the supporting portions 32 while mistaking the left and right directions so that the mounting direction of the operating stick 28 is not mistaken.

Since the shaft portions 31 are loosely and pivotably engaged to the respectively corresponding supporting portions 32, the engaging is performed easily. Moreover, the upward movement of the shaft portions 31 is prevented by the supporting portions 32. Accordingly, the supporting portions 32 prevent the operating stick 28 from coming off. The shaft portions 31 are aligned with the pivot shaft 22*a* and the pivot shaft 23*a*. Further, the concave portion 21*d* provided on the base portion 21*c* prevents the operating stick 28 from being pushed in.

According to the joy stick 20 of this embodiment, the metal-made upper casing 21*b*, the bearing 41 for rotatably supporting the pivot shaft 23*a* is provided in the inclined surface which are formed in the vicinity of the worked surface formed at the time of manufacturing of the upper casing 21*b* by avoiding the worked surface. Therefore, the pivot shaft 23*a* is not affected by the burrs which are likely to be produced at the time of press working. This makes it possible to obtain smooth pivoting operation, to prevent the pivot shaft 23*a* from damage, so that the product lifetime may be improved.

In addition, since the edge portion 43 at the axial end of the pivot shaft 23*a* is received by being brought into line contact with the bearing 41, the contact resistance occurring due to friction during operation is reduced, and pivoting operation feeling may be improved. Further, the edge portion at the axial end is received by the inclined surface, so that the thrust force of the pivot shaft may be received at the same time.

Further, since the metal-made upper casing 21*b* is used, sufficient strength may be obtained, and the downsizing of the joy stick 20 also becomes possible. In addition, the joy stick 20 may be mounted stably on the board by using the mounting projections 17 which are parts of the metal-made upper casing 21*b*.

As described above, the inner side of the metal casing of the joy stick is subjected to drawing such that pivot shaft abut against the inner surface of the metal casing. According to this construction, since the worked surfaces of the metal casing are not brought into direct contact with the crankshaft, efficient manufacture is made possible in the manufacturing of the metal casing without paying particular attention to the worked surfaces of the metal casing.

According to this invention, there is no sliding surface which slide on the worked metal surface as in the related-art joy stick, and the contact occurs between the resin members. Therefore, even if the joy stick is pivoted with a strong force in the operation of such as a game machine, the joy stick may be pivotably operated smoothly. In addition, since a cover casing is made of a metal, a thickness of the cover casing may be made thin as compared with a resin made cover casing. Further, since the crankshaft is difficult to become damaged, the product lifetime is prolonged, and an improvement in the performance may be attained.

In the invention, various changes and modifications may be made without departing from the spirit of the invention, and it goes without saying that such changes and modifications are intended to be covered by the invention. For example, in the structure of this embodiment a structure is disclosed in which the bearing 41 and the pivot shaft 23*a* abut against each other through line contact; however, they may abut against each other through surface contact insofar as the worked surface does not come into contact with the pivot shaft 23*a*.

What is claimed is:

1. A joy stick comprising:

a first casing, comprised of metal and having a side face formed with a cutout portion;

a second casing, comprised of resin;

an operating stick; and a pivot member, pivotably supporting the operating stick, having a pivot shaft and being disposed between the first casing and the second casing so as to be pivotable about the pivot shaft, wherein the pivot shaft is rotatably supported by a part of the first casing which is other than an edge of the cutout portion.

2. The joy stick as set forth in claim 1, wherein:

a periphery of the cutout portion is protruded from the side face so that an inner face of the periphery is inclined; and a peripheral edge of an end face of the pivot shaft is in line contact with the inclined inner face.

* * * * *